US006360833B1

(12) United States Patent
Valencia

(10) Patent No.: US 6,360,833 B1
(45) Date of Patent: Mar. 26, 2002

(54) CHAIR LIFT FOR STAIRS

(76) Inventor: Joseph R. Valencia, 5 Porto Marino In., San Carlos, CA (US) 94070

(*) Notice: Subject to any disclaimer, the term of this patent is extended or adjusted under 35 U.S.C. 154(b) by 0 days.

(21) Appl. No.: 09/544,230

(22) Filed: Apr. 7, 2000

(51) Int. Cl.[7] ................................................ B62D 57/00
(52) U.S. Cl. ........................ 180/7.5; 187/201; 280/5.24
(58) Field of Search ................................ 187/200, 201, 187/202; 280/5.2, 5.24, DIG. 10; 180/7.5

(56) References Cited

U.S. PATENT DOCUMENTS 3,137,511 A * 6/1964 Weil et al. ................. 280/5.24
4,473,234 A * 9/1984 Egen ......................... 280/5.22
4,892,323 A * 1/1990 Oxford ....................... 180/7.5
5,179,746 A * 1/1993 Rogers .......................... 5/625
5,253,885 A * 10/1993 McCracken et al. ......... 280/5.2
5,269,544 A * 12/1993 Park .......................... 280/5.24
5,338,048 A * 8/1994 Medina ..................... 280/5.22
5,553,548 A * 9/1996 Eaton ......................... 104/183
6,079,517 A * 6/2000 Payne ........................ 182/187
6,095,284 A * 8/2000 Smith ......................... 182/103

* cited by examiner

*Primary Examiner*—Thomas J. Brahan

(57) ABSTRACT

Chair Lift for Stairs with a light weight metal chair frame mounted to a pair of metal slidable sled rails, the chair frame supporting a fabric seat and back, a set of wheels mounted to the base of the rails, a thigh retaining sling mounted below the chair frame, an electric winch type mechanism mounted between the sled rails, the winch mechanism having a pulling cable located near the center line of the chair frame, the chair frame also containing a rechargeable battery to be used as a power source for said winch, said chair frame also having a manual pull strap attached to the top cross rail of said chair frame, said chair frame being collapsible for easy transport, and said chair frame also includes a retractable third wheel that can be deployed at the bottom rear center of said chair so that said chair can act as an emergency wheel chair.

1 Claim, 3 Drawing Sheets

CHAIR LIFT FOR STAIRS

BACKGROUND OF THE INVENTION

This invention relates generally to the field of devices for disabled persons, and more particularly to a chair lift for stairs.

People who have a physical disability that makes it impossible to walk up a flight of stairs have had very few choices as to how to be transported from one floor to another. They can be carried by another person. If the stairs in question is in a commercial establishment, a person in a wheel chair can be transported in an elevator. In a private dwelling some people go to the expense of installing an electric powered chair lift that consists of a rail transport mounted to one wall and a corresponding chair that mounts to the rail. A linear translation device within the rail causes a slide bar that is mounted to the chair to rise or lower. These chair lifts cost approximately eight thousand dollars and of course are relatively permanent installations.

One might try to pull a person up a stairs while that person is in a wheel chair, however doing so causes the disabled person to bumb uncomfortably from one stair tread to the next.

While the above mentioned solutions provide some ways of transporting a disabled person up and down a flight of stairs, they do not adequately address certain situations. For example, if a disabled person is visiting a private residence and needs to reach the second story. Or, the person in question does not have the resources to purchase an eight thousand dollar stair climber, or if the person in question is temporarily disabled and needs a temporary solution for getting up and down a flight of stairs.

SUMMARY OF THE INVENTION

The primary object of the invention is to provide a device that helps a disabled person to be effortlessly lifted up a flight of stairs while in a sitting position.

Another object of the invention is to provide a person lifting device that is relatively light weight and can be collapsed for easy transport.

Another object of the invention is to provide a person lifting device that is relatively inexpensive.

Other objects and advantages of the present invention will become apparent from the following descriptions, taken in connection with the accompanying drawings, wherein, by way of illustration and example, an embodiment of the present invention is disclosed.

A chair lift for stairs comprising: a light weight metal chair frame mounted to a pair of metal slidable sled rails, said chair frame supporting a fabric seat and back, a set of wheels mounted to the base of said rails, a calf retaining sling mounted below said chair frame, an electric winch type mechanism and associated power supply mounted between said sled rails, said winch mechanism having a pulling cable located near the center line of said chair frame, said chair frame also having a manual pull strap attached to the top cross rail of said chair frame, said chair frame being collapsible for easy transport, and said chair frame also includes a retractable third wheel that can be deployed at the bottom rear center of said chair so that said chair can act as an emergency wheel chair.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
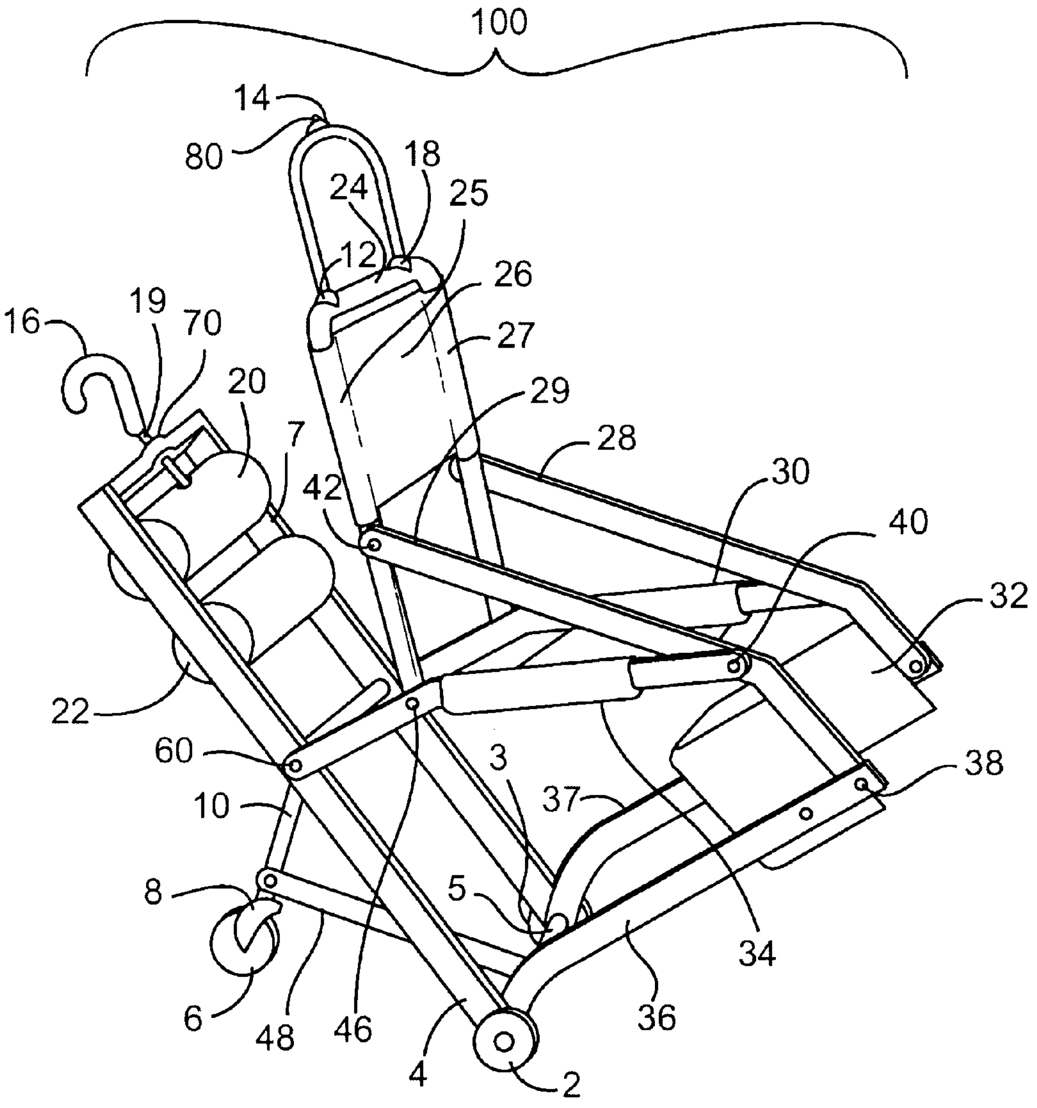
FIG. 1 is a perspective view of the stair climbing chair of the present invention.

Referring now to FIG. 1 we see a chair lift for stairs of the present invention 100 for enabling a disabled person to ascend or descend a flight of stairs. The chair lift 100 can be used as a temporary wheel chair when back wheel 6 is deployed and used in conjunction with front wheels 2, 3. The chair portion is comprised of a seat member 30 and a back member 26 that are made of a flexible material such as fabric that can be found on a standard beach chair. The chair frame is comprised of an inverted U shaped back frame 24, 25, 27 and seat frame 34, 28, 29, 28. Arms 36, 36 hold chair frame members 28, 29 in the proper orientation as shown. A flexible calf retaining strap 32 is also supported by arm members 36, 37. Rear sliding sled rails 4, 7 attach to chair frame members 34, 28 at point 60 and its corresponding point on frame member 28 and at the wheel 2, 3 location. Sled members 4, 7 also enclose a winch 20 and battery supply 22. Winch cable 19 protrudes from center guide 70 and terminates in hook 16. Strap 14 is held to the end of sled rails 4, 7 at D rings 12, 18.

Figure 2:
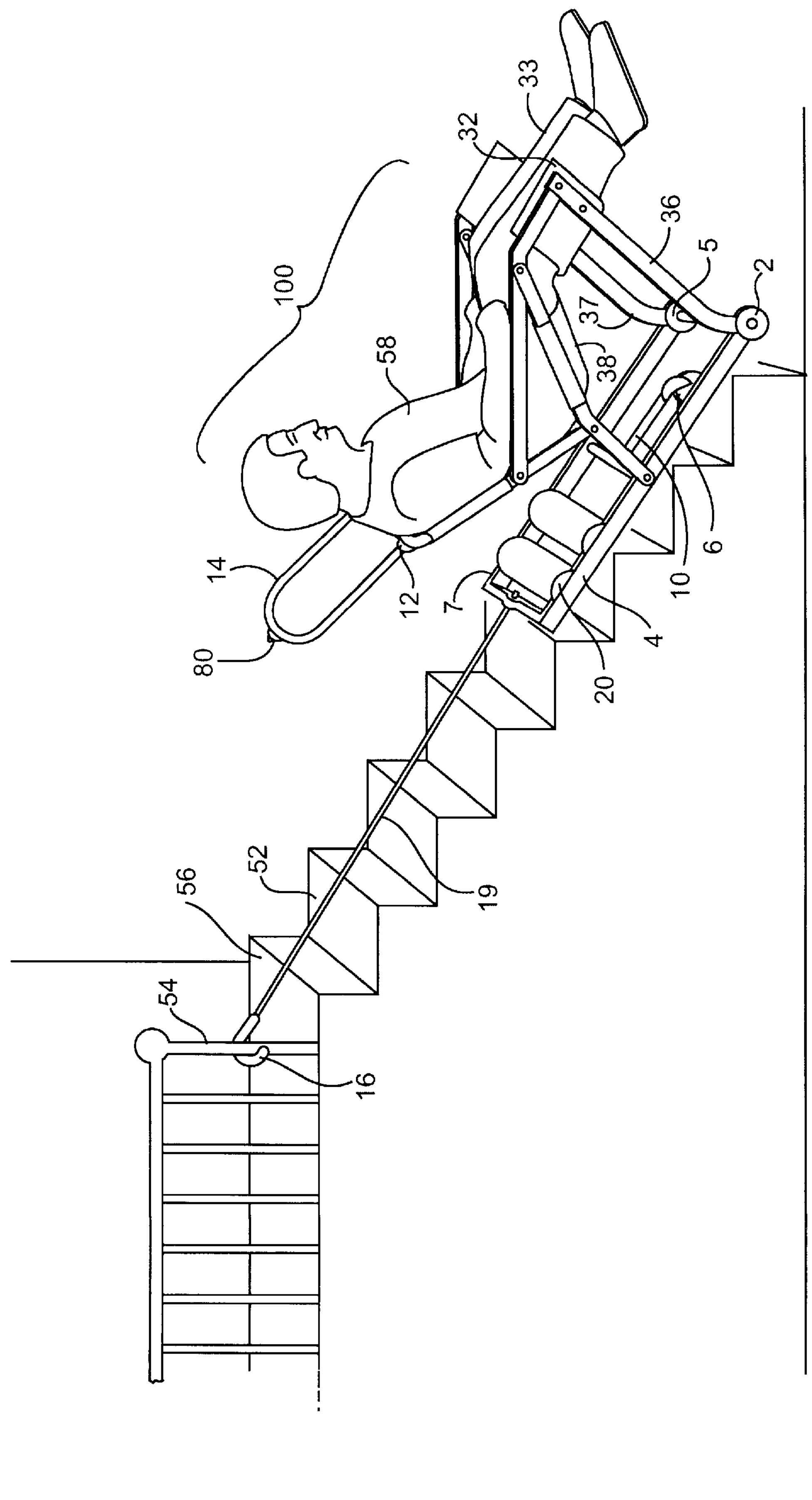
FIG. 2 is a person using the stair chair of the present invention.

Referring now to FIG. 2 we see a side view of a person 58 seated in stair chair 100 and about to be lifted up a flight of stairs 52. Wheels 2,3 are at ground level 50. Sled members 4, 7 are flush with the edges of stair treads 52. Winch cable 19 is extended and hook 16 is attached to bannister post 54. Rear wheel 6 is in its retracted position so that it does not interfere with the sliding ability of sled members 4, 7. Person 58 is comfortably seated and his legs are supported off the ground by leg strap 32. To aid person 58 in navigating the stairs 52 an assistant would stand behind the chair 100 and grab strap 14 which is attached to chair top cross bar 24 at D rings 12, 18. An on/off switch 80 is located at the center of strap 14. Depressing the switch 80 causes winch 20 to activate thereby raising chair assembly 100 as it rides on sled members 4, 7. As the chair 100 approaches the top of the stairs 52 the assistant pulls on strap 14 to raise wheels 2, 3 to level 56. Third wheel 6 can then be deployed to allow the chair 100 to be in a normal upright position. To travel down stairs 52 the reverse procedure is applied. Obviously, an assistant could pull a the chair assembly 100 up the stairs by strap 14 alone if necessary. By eliminating winch 20 and battery pack 22 a less expensive and lighter weight version of the unit 100 could be produced.

Figure 3:
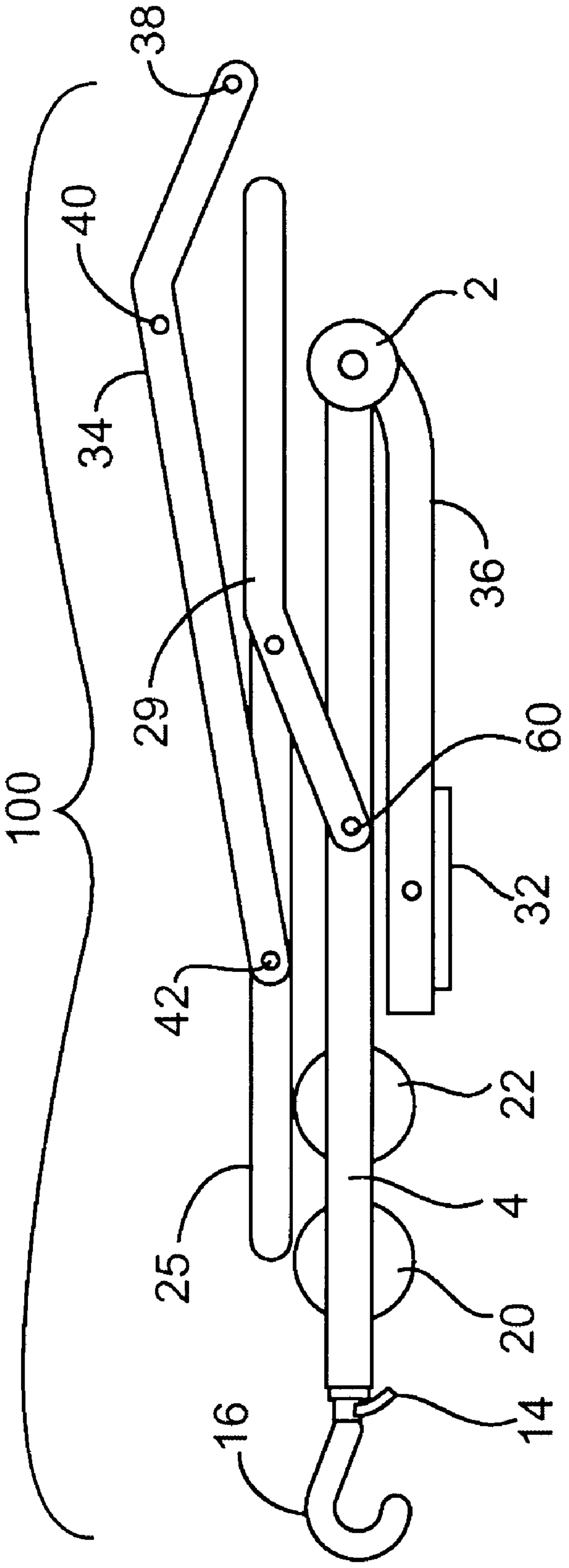
FIG. 3 is a side view of the present invention in the collapsed position.

FIG. 3 shows a side view of the chair 100 of the present invention in the closed or collapsed position. Removable and replaceable pins can be removed from major hinge points to allow the chair 100 frame members to fold in on each other as shown. In this way the present invention 100 can be easily transported in the trunk of a car or other similar conveyance.

As the above descriptions and illustrations demonstrate, the present stair climbing chair invention 100 can provide a much needed means for disabled persons to navigate a flight of stairs. The unit 100 is light weight and relatively inexpensive. The retail cost of the present invention is estimated to be approximately $300.00 with the winch and $150.00 without the winch. The chair 100 is ideal for people who can not afford an eight thousand dollar electric chair lift or who are temporarily disabled and also ideal for when a disabled person visits a residence and needs aportable chair lift to reach the second floor or higher.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Chair Lift for Stairs comprising:

a light weight metal chair frame mounted to a pair of metal slidable sled rails;

said chair frame supporting a fabric seat and back;

a set of wheels mounted to the lower end of said sled rails;

a calf retaining sling mounted below said chair frame;

an electric winch mechanism and associated power supply mounted between said sled rails;

said winch mechanism having a pulling cable located near the center line of said chair frame;

said chair frame also having a manual pull strap attached to a top cross rail of said chair frame;

said chair frame being collapsible for easy transport; and said chair frame also includes a retractable wheel that can be deployed at the bottom rear center of said chair so that said chair can act as an emergency wheel chair.

* * * * *